(12) United States Patent
Todd et al.

(10) Patent No.: US 10,915,961 B1
(45) Date of Patent: Feb. 9, 2021

(54) CALCULATING ASSET VALUE USING MULTI-DIMENSIONAL MODELS

(71) Applicant: EMC IP Holding Company LLC, Hopkinton, MA (US)

(72) Inventors: Stephen Todd, Shrewsbury, MA (US); Jeffrey Norton, Laguna Niguel, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 379 days.

(21) Appl. No.: 15/669,523

(22) Filed: Aug. 4, 2017

(51) Int. Cl.
  *G06Q 40/06* (2012.01)
  *G06Q 40/08* (2012.01)

(52) U.S. Cl.
  CPC ............. *G06Q 40/06* (2013.01); *G06Q 40/08* (2013.01)

(58) Field of Classification Search
  None
  See application file for complete search history.

(56) References Cited

U.S. PATENT DOCUMENTS

| | | | |
|---|---|---|---|
| 6,173,276 B1* | 1/2001 | Kant | G06F 17/13 706/50 |
| 6,338,067 B1* | 1/2002 | Baker | G06Q 20/201 379/115.01 |
| 6,389,418 B1* | 5/2002 | Boyack | G06F 16/34 |
| 7,756,896 B1* | 7/2010 | Feingold | G06Q 40/06 707/791 |
| 8,571,909 B2* | 10/2013 | Miller | G06Q 10/00 705/7.11 |
| 2005/0027645 A1* | 2/2005 | Lui | G06Q 40/025 705/38 |
| 2005/0209940 A1* | 9/2005 | Lea | G06Q 40/00 705/35 |
| 2006/0218066 A1* | 9/2006 | Block | G06Q 40/08 705/35 |
| 2007/0005477 A1* | 1/2007 | McAtamney | G06Q 40/06 705/35 |
| 2008/0177592 A1* | 7/2008 | Masuyama | G06Q 10/04 705/7.36 |
| 2008/0249957 A1* | 10/2008 | Masuyama | G06Q 40/06 705/36 R |
| 2011/0153448 A1* | 6/2011 | Thomas | G06Q 10/06313 705/26.3 |
| 2014/0164290 A1* | 6/2014 | Salter | G06Q 40/06 705/36 R |

OTHER PUBLICATIONS

U.S. Appl. No. 14/863,783, filed in the name of Stephen Todd et al. Sep. 24, 2015 and entitled "Unstructured Data Valuation."

(Continued)

*Primary Examiner* — William J Jacob
(74) *Attorney, Agent, or Firm* — Ryan, Mason & Lewis, LLP (57) ABSTRACT

At least one asset of a given enterprise is identified. The enterprise has a plurality of groups associated therewith. A valuation is computed for the asset using a multi-dimensional model configured to generate cross-group impact values with respect to the asset and two or more of the groups associated with the enterprise. In one example, the multi-dimensional model is in the form of a matrix data structure and the cross-group impact values are off-diagonal entries of the matrix data structure.

20 Claims, 5 Drawing Sheets

(56) References Cited

OTHER PUBLICATIONS

U.S. Appl. No. 14/998,112, filed in the name of Stephen Todd et al. Dec. 24, 2015 and entitled "Data Valuation Based on Development and Deployment Velocity."
U.S. Appl. No. 15/135,790, filed in the name of Stephen Todd et al. Apr. 22, 2016 and entitled "Data Valuation at Content Ingest."
U.S. Appl. No. 15/135,817, filed in the name of Stephen Todd et al. Apr. 22, 2016 and entitled "Data Value Structures."
U.S. Appl. No. 15/136,327, filed in the name of Stephen Todd et al. Apr. 22, 2016 and entitled "Calculating Data Value Via Data Protection Analytics."
Doug Laney, "The Economics of Information Assets," The Center for Infonomics, http://www.smarter-companies.com/group/icpractitioners/forum/topics/abstract-and-slides-for-today-s-session-on-infonomics-by-doug, Sep. 13, 2011, 22 pages.

* cited by examiner

CALCULATING ASSET VALUE USING MULTI-DIMENSIONAL MODELS

FIELD

The field relates generally to data processing and, more particularly, to asset valuation techniques.

BACKGROUND

Valuation algorithms allow owners of content to associate economic or business value to their data assets. This value can then potentially be used as input to a variety of business functions.

However, existing approaches calculate the total value of a data set based on a single-value evaluation. Calculating the total value of a data set based on a single-value evaluation results in a single cost value. Such a single cost value can limit the usefulness of the data valuation process.

SUMMARY

Embodiments of the invention provide automated asset valuation techniques using multi-dimensional models.

For example, in one embodiment, a method performed by one or more processing devices comprises the following steps. At least one asset of a given enterprise is identified. The enterprise has a plurality of groups associated therewith. A valuation is computed for the asset using a multi-dimensional model configured to generate cross-group impact values with respect to the asset and two or more of the groups associated with the enterprise.

In one example, the multi-dimensional model is in the form of a matrix data structure and the cross-group impact values are off-diagonal entries of the matrix data structure.

Advantageously, illustrative embodiments provide techniques for calculating cross-group costs via matrix representations to generate valuation calculations with improved precision.

These and other features and advantages of the invention will become more readily apparent from the accompanying drawings and the following detailed description.

DETAILED DESCRIPTION

Illustrative embodiments may be described herein with reference to exemplary cloud infrastructure, data repositories, data centers, data processing systems, computing systems, data storage systems and associated servers, computers, storage units and devices and other processing devices. It is to be appreciated, however, that embodiments of the invention are not restricted to use with the particular illustrative system and device configurations shown. Moreover, the phrases "cloud infrastructure," "data repository," "data center," "data processing system," "information processing system," "computing system," "data storage system," "data lake," and the like as used herein are intended to be broadly construed so as to encompass, for example, private and/or public cloud computing or storage systems, as well as other types of systems comprising distributed virtual infrastructure. However, a given embodiment may more generally comprise any arrangement of one or more processing devices.

As used herein, the following terms and phrases have the following illustrative meanings:

"valuation" illustratively refers to a computation and/or estimation of something's worth or value; in this case, data valuation is a computation and/or estimation of the value of a data set for a given context;

"context" illustratively refers to surroundings, circumstances, environment, background, settings, characteristics, qualities, attributes, descriptions, and/or the like, that determine, specify, and/or clarify something; in this case, for example, context is used to determine a value of data;

"structured data" illustratively refers to data that resides in fixed fields within a document, record or file, e.g., data contained in relational databases and spreadsheets; and "unstructured data" illustratively refers to data that is not considered structured data (in which case, some "semi-structured" data asset may also be considered unstructured data), e.g., documents, free form text, images, etc.;

"metadata" illustratively refers to data that describes other data; and

"enterprise" illustratively refers to a business, a company, a venture, or the like.

It is to be appreciated that while illustrative embodiments describe asset valuation from the perspective of data sets, i.e., data valuation, other assets (e.g., applications, services, etc.) can be valued using these techniques.

Before describing illustrative embodiments, examples of specific drawbacks associated with existing data valuation approaches will be discussed.

As mentioned above in the background section, calculating the total value of a data set based on a single-value evaluation of the data set generates a single cost value. When considering various functional uses of data (e.g., backup, enterprise planning, discovery, etc.) or use by different organizations (within the enterprise or even multiple enterprises), it is realized herein that such an approach eliminates the ability to treat each of these groups (e.g., functional uses, different organizations, etc.) separately. As a result, cross-enterprise costs are not accurately taken into account in existing approaches.

That is, while calculating the economic or business value of data has a broad set of benefits, the value of data varies depending on various aspects or dimensions of the data, for example:

(i) Criticality of data differs for various business processes such as enterprise planning, discovery, engineering and manufacturing, marketing, project and product planning and tracking, etc.

(ii) Value of data likely differs from group to group within an organization. Calculating the true cost of storing data, especially under complex policies determined by information technology (IT) costing of data management is difficult when calculated as a single value.

(iii) The activity level (stale to "hot") of a data item differs from organization to organization within an enterprise and can differ over time.

The existing single-value approach calculates the value of specific measures by plugging the variables into the corresponding value equation.

By way of example, a set of data valuation models are described in D. Laney, "The Economics of Information Assets," The Center for Infonomics, Smarter Companies presentation, September 2011. The set of data valuation models, however, are all single-value (one dimensional) evaluations. Such valuation models include a set of non-financial models and set of financial models. For example, two of these models are an intrinsic value of information (IVI) model and a business value of information (BVI) model.

The IVI model is computed as: IVI=Validity*Completeness*(1−Scarcity)*Lifecycle, where "validity" is the percentage of data set correctness, "completeness" is the percentage of completeness of the data set, "scarcity" is the uniqueness of the data set, and "lifecycle" is the time the data set is usable.

The BVI model is computed as: BVI=Σ Relevance*Validity*Completeness*Timeliness, where validity and completeness are the same as in the IVI model, "relevance" is a summation of how useful the data set is to multiple business processes, and "timeliness" is a measure of the update frequency of the data set. Each of these models, while taking into account some variables (validity, relevance, etc.), result in a single total value for the data set, i.e., one total intrinsic value and one total business value.

These existing single-value equations have a number of different weaknesses. For example, it is realized herein that anytime data is segregated for any reason, valuating data based on a single-value approach fails to take into account cross-organizational costs.

A cost can be thought of as something that subtracts from the value of a data set. Cross-organizational costs that reduce value include, but are not limited to, storing data, cleaning data, transferring data, processing data, and protecting data.

Modeling value with a single-value equation does not capture the cost of communication and dependencies between groups within the enterprise.

Specifically, it is realized that the following illustrative problems exist with the single-value approach:

(i) Many of the variables described above (e.g., scarcity, relevance, timeliness, etc.) are subjective and/or difficult to quantify in their relationship to other organizations.

(ii) Whenever data becomes segregated (e.g., data is spread out on different storage silos/systems, different clouds, etc.), valuing data based on single parameters becomes not only more complex but often times infeasible.

(iii) A single-value equation such as the IVI equation or BVI equation above does not take into account the cost of communication and dependencies between groups within the enterprise. These costs can subtract from overall value. For example, the BVI equation computes a summation over business processes but does not take into account cross-organizational costs.

(iv) The cost for either transferring or sharing data between organizations is not factored into the overall value.

(v) The size of an organization is not taken into account by single-value equations. There are no scaling factors that are built into the variables.

(vi) Data within the enterprise may have different valuation, lifecycle, and usage depending on the department or discipline utilizing the data. There is no way to calculate these values over time by department or business group.

(vii) Given the lack of insight into cross-group valuation, it is therefore not possible to effectively optimize costs across the enterprise or minimize costs that favor one individual group.

(viii) Two organizations (A and B) may incur different costs depending on which direction the data is shared. For example, Org A (engineering organization) may share detailed engineering specifications with Org B that may require little to no modifications. However, when Org B shares data back to Org A, there may be significant cleaning (at cost X) that must occur before that data is useful to Org A. Existing valuation approaches do not reflect such an asymmetric phenomenon.

Embodiments of the invention overcome the above and other drawbacks with existing data valuation approaches by providing multi-dimensional data valuation model functionality. More particularly, illustrative embodiments introduce matrix equations to model data value across, e.g., multiple organizations, multiple functions, multiple locations, etc. (which will be generally referred to herein as "groups"). These groups may, for example, represent different organizations or functions within an enterprise. However, the groups can also refer to different storage locations such as, for example, when data is stored in different clouds or different data centers. As mentioned above, data segregation inhibits valuation using single-value equations. Modeling with a single-value equation does not capture the cost of communication and dependencies between groups within an enterprise. However, as will be further explained, illustrative embodiments use matrix equations to more accurately reflect these costs.

Casting valuation equations as matrix equations assists in capturing cross-group costs. A matrix is a rectangular array of numbers which, in illustrative embodiments, is used to represent a system of equations. Advantageously, existing single-value equations (e.g., IVI and BVI equations above) can be re-cast as matrices as follows.

A single-value equation can represent the data valuation to one organization as:

$$ax = \text{Value}$$

where a is a weighting factor and x is the valuing variable of interest. Value is the total value due to the valuing variable.

In contrast, a multi-dimensional or matrix equation for two groups in the organization, where the value to each of the two groups is completely independent, is as follows:

$$\begin{bmatrix} a_{11} & 0 \\ 0 & a_{22} \end{bmatrix} \begin{Bmatrix} x_1 \\ x_2 \end{Bmatrix} = \begin{Bmatrix} \text{Value}_1 \\ \text{Value}_2 \end{Bmatrix}$$

The weighting factors have essentially become coefficients in the matrix which when written as value equations for organizations 1 and 2 appear as follows:

$$a_{11} x_1 = \text{Value}_1 \quad \text{(Eq. 1)}$$

$$a_{22} x_2 = \text{Value}_2 \quad \text{(Eq. 2)}$$

Illustrative embodiments use off-diagonal entries to reflect inter-group impact.

In one example, assume that there is a cost for transferring or sharing data between organizations 1 and 2. Illustrative embodiments account for these costs with the off-diagonal entries $a_{12}$ and $a_{21}$ in the matrix below:

$$\begin{bmatrix} a_{11} & a_{12} \\ a_{21} & a_{22} \end{bmatrix} \begin{Bmatrix} x_1 \\ x_2 \end{Bmatrix} = \begin{Bmatrix} \text{Value}_1 \\ \text{Value}_2 \end{Bmatrix}$$

which when written out as value equations for the organizations becomes:

$$a_{11}x_1 + a_{12}x_2 = \text{Value}_1 \quad \text{(Eq. 3)}$$

$$a_{22}x_2 + a_{21}x_1 = \text{Value}_2 \quad \text{(Eq. 4)}$$

Note that entries $a_{12}$ and $a_{21}$ can essentially represent negative values that would therefore negatively impact the equation values for organization 1 and 2 shown above as Eq. 1 and Eq. 2, respectively.

In other words, for the IVI and BVI model examples above, the single value is offset by any associated cross-organizational cost.

For simplicity, the matrix equation can be written as:

$$A\overline{x} = \overline{\text{Value}}$$

where the bolded letter represents a matrix and all other values represent scalars.

As indicated above, the cost to a group (for example, an organization in the enterprise) is represented by a row in the matrix equation.

As will be explained further below, single-value equations such as the IVI and BVI models above can be recast as matrix equations. For example, consider the "validity" variable in both equations, which represents the percentage of correctness of the data set. Each business unit, for example, may create their own view of validity, but validity in the IVI model does not represent multi-group views into the validity of data. However, in accordance with illustrative embodiments, incorporating a "multi-group" point of view in off-diagonal matrices allows the variable "validity" to actually become a matrix (a bolded V).

The matrix can be arbitrarily large, so many different organizations and functions (i.e., groups) may be represented. Further, if two organizations experience different costs based on the direction (flow) of the data between organizations, these can be reflected by using non-symmetric matrices. By the term "non-symmetric matrix" as illustratively used herein (or asymmetric matrix), it is intended to describe the asymmetry in the costing that the matrices, according to illustrative embodiments, are able to reflect or capture.

Before illustrating further examples of matrix representations, an illustrative system and methodology is described in the context of FIGS. 1-5 according to one or more illustrative embodiments.

Figure 1:
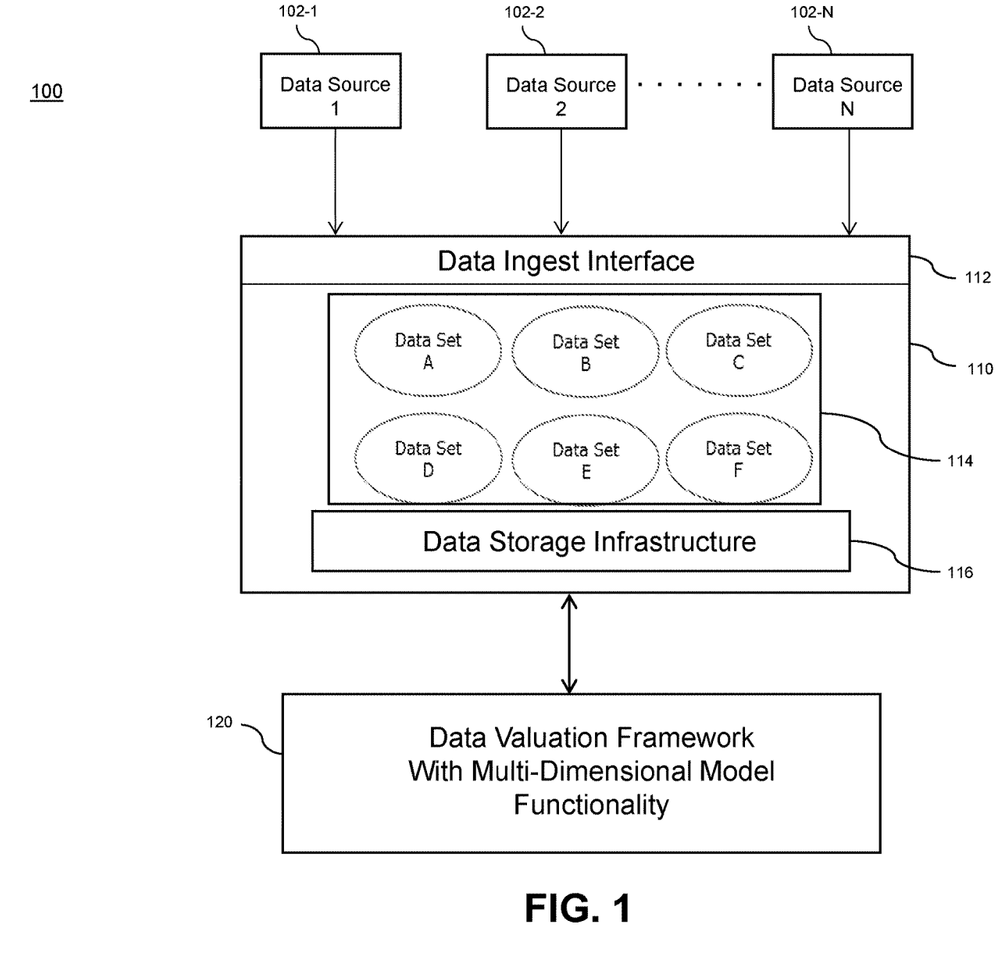
FIG. 1 illustrates a data storage system environment with a data valuation framework using multi-dimensional model functionality, according to an illustrative embodiment.

FIG. 1 illustrates a data storage system environment in which multi-dimensional model valuation embodiments of the invention can be implemented. As shown, in data storage system environment 100 (which may be implemented as a cloud computing platform in an illustrative embodiment), data sources 102-1, 102-2, . . . 102-N provide data to data storage system 110 through a data ingest interface 112. In illustrative embodiments, one or more of the data sources 102-1, 102-2, . . . 102-N may provide streaming data (i.e., data streams). However, one or more of the data sources 102-1, 102-2, . . . 102-N may also provide non-streaming data. The data storage system 110 comprises a plurality of data sets 114 (data sets A-F) that are stored on data storage infrastructure 116. The data sets 114 comprise the data from the data sources 102 (e.g., data files), but can also include other data. The data sets 114 may each have their own domain-specific data (e.g., customer data, employment data, credit data, etc.) corresponding to one or more of data sources 102-1, 102-2, . . . 102-N.

Data storage infrastructure 116 may comprise one or more compute elements (e.g., servers), network elements (e.g., switches, routers) and/or storage elements (e.g., storage devices, storage arrays). Data storage system 110 can be part of one or more data centers managed by one or more service providers, one or more data centers privately managed by an enterprise, or some combination thereof. Also note that while data storage infrastructure 116 is illustrated as a single storage component in FIG. 1 within which data sets 114 are stored, it is to be understood that the data storage infrastructure 116 may be geographically distributed or otherwise distributed such that all the data sets 114 are duplicated on multiple storage infrastructure or the data sets 114 are separately distributed on multiple storage infrastructure.

Figure 2:
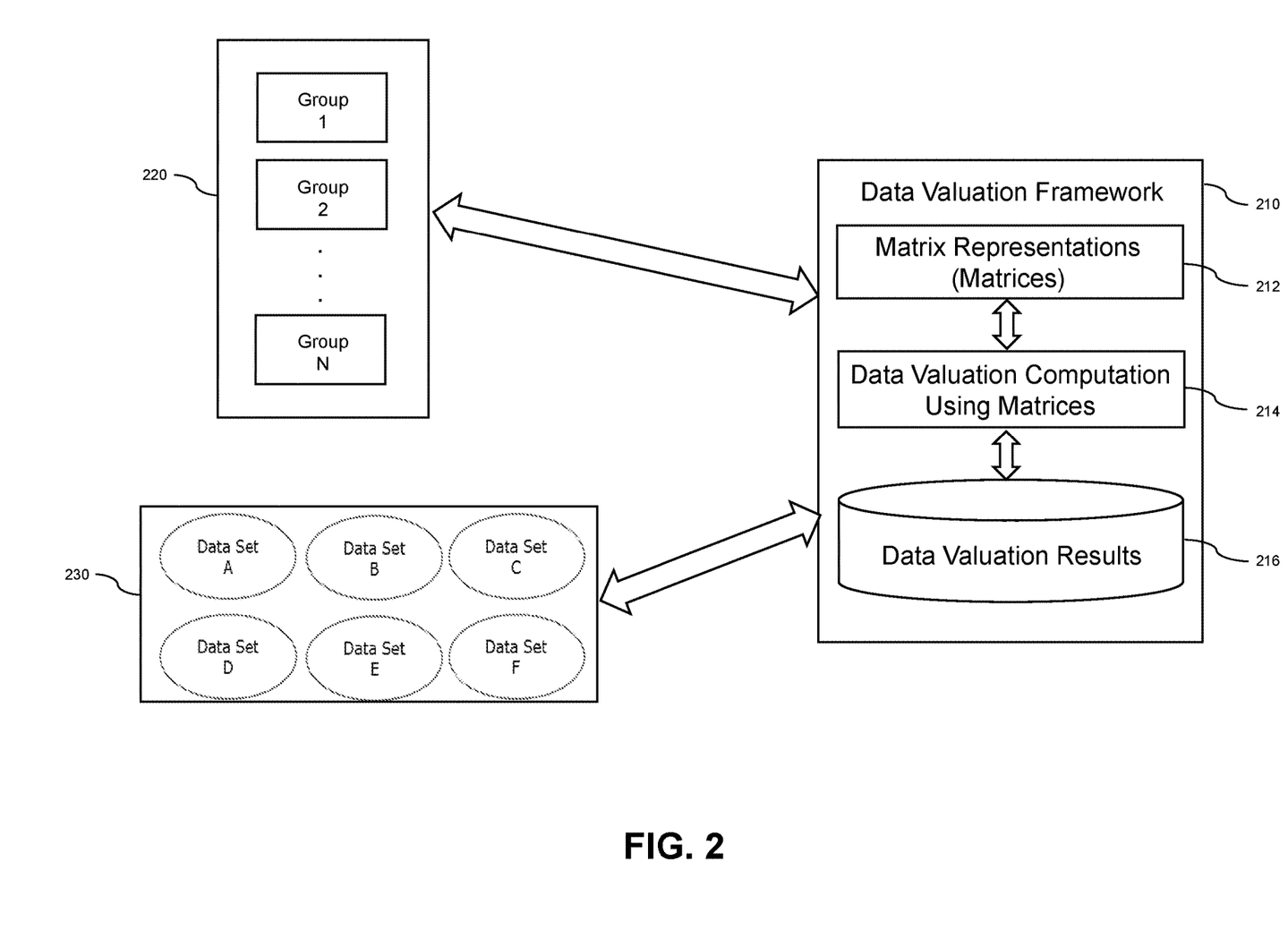
FIG. 2 illustrates a data valuation framework using multi-dimensional model functionality, according to an illustrative embodiment.

The value of data, such as the data from data sources 102-1, 102-2, . . . 102-N stored as data sets 114, is calculated by data valuation framework 120. Illustrative embodiments calculate data valuation metrics for the data sets 114 utilizing the above-described multi-dimensional model (e.g., matrices) functionality. FIG. 2 shows further details of the data valuation framework 120.

More particularly, FIG. 2 illustrates a data valuation framework 210 using multi-dimensional model functionality, according to an illustrative embodiment. Framework 210 is an example of framework 120 shown in FIG. 1. As shown, data valuation framework 210 comprises matrix representations (matrices or matrix data structures) 212 which are used in data valuation computations 214 to generate data valuation results 216. Advantageously, as explained above, data valuation framework 210 takes into account the set of groups 220 (Group 1, Group 2, . . . Group N) when performing data valuation of data sets 230 (e.g., data sets A-F of FIG. 1). That is, the matrices 212 model data value for each of data sets 230 across multiple groups 220 (e.g., organizations, functions, storage locations, etc.). Then, data valuation computation 214 generates values using the corresponding matrix for a given data set that reflects the inter-group impact (i.e., cross-group impact values). The data valuation results 216 may be stored in a form that allows an administrator or other party or system to view the multiple dimensions of the value calculation for a data set for each group. For example, recall Eq. 3 above. As applied to the example in FIG. 2, $a_{11}x_1$ can reflect the value of Data Set A for Group 1, while $a_{12}x_1$ reflects the impact of Group 2 as it relates to Group 1 for Data Set A (i.e., a cross-group impact value or sub-computation). Each of these sub-computations ($a_{11}x_1$ and $a_{12}x_1$) can be stored as values in the data valuation results 216, as well as the total of these sub-components as a total value. Recall that Group 2 may have a negative impact on Data Set A as it relates to Group 1 and thus the second sub-computation $a_{12}x_1$ would be subtracted from the first sub-computation. However, alternatively, the impact could be positive and thus the sub-computations would be added.

Figure 3:
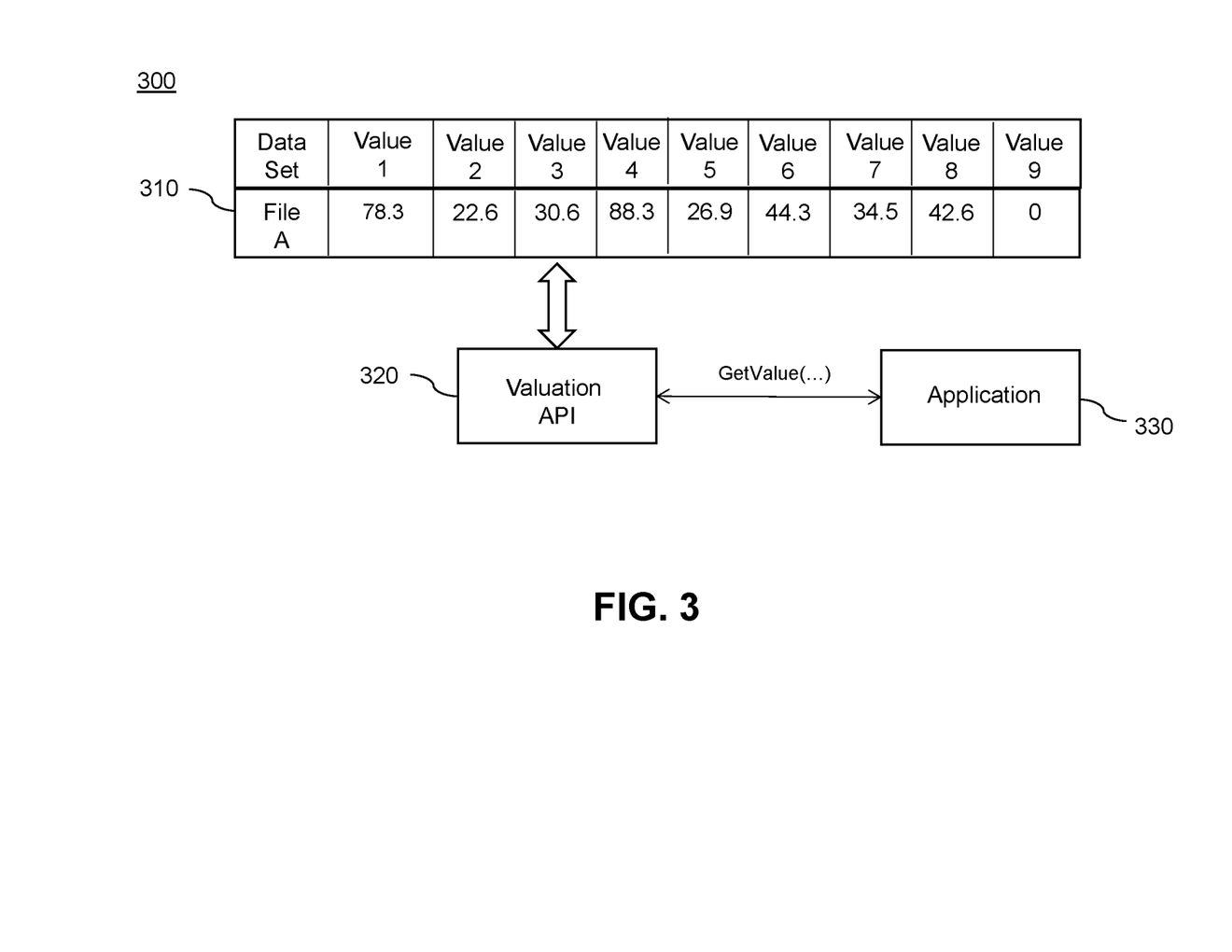
FIG. 3 illustrates an example of a data valuation table generated by a data valuation algorithm using multi-dimensional model functionality, according to an illustrative embodiment.

FIG. 3 illustrates an example 300 of a data valuation table generated by a data valuation algorithm using multi-dimensional model functionality, according to an illustrative embodiment. More particularly, data valuation table 310 may represent data valuation results 216 in FIG. 2 calculated for a given data one of the data sets 230 including the above-described sub-computation values and total values.

As shown in example 300 in FIG. 3, a valuation table 310 represents a table stored for file A (i.e., a data set). Table 310 shows illustrative Values 1-9 which may represent results from different sub-computations (including cross-group impact values) from part of a matrix representation for file A. By way of example only, assume Value 1 is the computed data value for File A for Group 1 independent of the other groups, while Values 2-9 are the computed cross-group impact values from Groups 2-9, respectively, as these groups impact the independent value (Value 1) of File A for Group 1. As further shown, a valuation application programming interface (API) 320 can fetch any values for file A from table 310 based on a query from an application 330.

Given the above-described illustrative framework, some examples of existing valuation variables recast as multidimensional matrix representations will now be described.

Many data valuation equations based on the valuation variables can be posed as multi-dimensional matrix equations. For demonstration purposes, the above-described IVI and BVI equations are recast as matrix equations. However, it is to be understood that embodiments can be applied to other models as well. For convenience, matrix notation is used where a bold letter represents a matrix and all other values are scalars. The data which is a multi-valued is italicized.

For ease of computation, the costs for each group are considered. Each row in a cost factor matrix is used to determine the value of data for a group including both direct (independent) and indirect (cross-group impact) values.

Based on this multi-dimensional approach to treating data valuations, The IVI and BVI models are recast as multidimensional vector equations for demonstration purposes.

IVI—Intrinsic value of information is recast as:

$$\overline{IVI} = V^* C^* (I-S)^* \overline{L(t)}$$

where I is the identity matrix. The identity matrix acts similar to the number one in scalar mathematics, that is, any square matrix multiplied by the identity matrix is equal to itself. Other variables are defined below. IVI is a vector where each entry is the intrinsic value of information for each group, but because of the matrix formulation, the total cost is not influenced by the interdependence between the groups.

Validity is the percentage of records in an information asset deemed to be correct by each group. For example, in an engineering document, the engineering specifications may be correct while cost estimations may be very preliminary and not have the same level of validity as the engineering specifications. Validity (V) is a non-symmetric matrix where the diagonal entries are the percentages deemed to be correct by the group and each of the off-diagonal entries i,j, i≠j are the correlations of documents that both group i and group j deem correct.

Completeness is the percentage of total records of the group versus the universe of potential or supposed records. Similar to the above example, perhaps the cost estimates are incomplete due to missing factors. Completeness (C) is a non-symmetric matrix where the diagonal entries are the percentages deemed to be complete by the group and each of the off-diagonal entries i,j, i≠j are the correlations of documents that both group i and group j deem complete.

Scarcity is the percentage of competitors that are also likely to have the same data. Consider competitive bids where methods used by different companies for technical and engineering work is similar, but one company has discovered a way to do costing and accounting that always makes them the low-cost bid. In this case, the engineering aspects are not scarce and therefore are not of great value, however, the costing and accounting methods are extremely valuable to that company. Scarcity (S) is a non-symmetric matrix where the diagonal entries are the percentages defined above for the group and each of the off-diagonal entries i,j, i≠j are the correlations of documents that both group i and group j share with all competitors.

Life cycle is the reasonable utility of a data record in the information asset. The life cycle of any piece of data is not a linear function, nor does that data have a period of usefulness never to be useful again. For example, old software code can be used to build a new software product, a previous aircraft wing design can be used to build a new wing, or an old data item may be critical in a discovery process.

Furthermore, these data items, while critical to the enterprise overall, are only measurable to particular departments, e.g., software engineering, legal discovery, etc. Note that different and multiple departments may value data differently as would be the case in a new aircraft program. Lifecycle therefore is also multi-valued, i.e., its value varies not only in time, but has different values at any time depending on the organization and business process evaluating the lifecycle. Lifecycle ($\overline{L(t)}$) is a vector of data utility measured over time, each value representing life cycle to a group.

BVI—Business value of information is recast as:

$$BVI = R^* V^* C^* \overline{T(t)}$$

where V and C are previously defined above and R and T are defined below.

Relevance is how useful information can be for the business process of each group. Any calculation of data value using relevance as a factor is therefore multi-valued, i.e., different relevance values depending on the business processes. Relevance (R) is a non-symmetric matrix where the diagonal entries are the relevance values defined for the group and each of the off-diagonal entries i, j, i≠j are the correlations of documents that both group i and group j deem relevant. $\overline{T(t)}$ represents the average usable life span per group of any data instance. This vector for the life span behaves very similarly to the above-described life cycle vector.

By way of another example, consider the data value equation: Ax+By+Cz=value. A, B, and C are coefficients (e.g., values or proportions) that multiply the x, y, and z values. Now consider the example where x, y and z represent geographic data storage locations, e.g., states, for a given enterprise. Thus, the equation may become:

1000*Massachusetts+1500*New York+ 800*California=Cost

Notice how the three coefficients, i.e., 1000, 1500, and 800, give relative value between the three different locations. Note also that each of the values for the states could be different. In one example, the coefficients can represent dollars per gigabyte and the three locations are the amount of data at those locations. Given this one equation, the enterprise could decide to store all its data in California to attempt to achieve minimal storage cost. However, the point of the matrix representation, according to illustrative embodiments, is that there are multiple factors impacting on this data, e.g., the cost to access data, latency (or closeness to the data to the data user), etc. The use of multi-dimensional modeling in the form of matrix data structures allows an enterprise to realize these cross-group impacts. Accordingly, more generally, illustrative embodiments provide data valuation governed by sets of complex (multi-dimensional) equations relating multiple forms of different features together. The sets of equations then are the rows in the matrix and each of the different columns are the features of interest. Advantageously, the matrix data structure represents costs to an organization including the direct (diagonal) and indirect (off diagonal) costs to each department (in a row) in an organization.

It is to be appreciated that while illustrative embodiments above have been described recasting IVI and BVI data valuation models as multi-dimensional models (matrices), other data valuation algorithms can similarly be recast with multi-dimensional models (matrices) to generate one or more of the data values. Examples of such other data valuation algorithms may comprise, but are not limited to:

unstructured tokenization algorithms (UTA) described in U.S. patent application Ser. No. 14/863,783, filed Sep. 24, 2015, entitled "Unstructured Data Valuation," the disclosure of which is incorporated herein in its entirety;

application development and deployment velocity valuation algorithms described in U.S. patent application Ser. No. 14/998,112, filed Dec. 24, 2015, entitled "Data Valuation Based on Development and Deployment Velocity," the disclosure of which is incorporated herein in its entirety;

data ingest valuation algorithms described in U.S. patent application Ser. No. 15/135,790, filed Apr. 22, 2016, entitled "Data Valuation at Content Ingest," the disclosure of which is incorporated herein in its entirety;

data value tree generation techniques described in U.S. patent application Ser. No. 15/135,817, filed Apr. 22, 2016, entitled "Data Value Structures," the disclosure of which is incorporated herein in its entirety; and valuation algorithms based on analysis of a backup and recovery ecosystem described in U.S. patent application Ser. No. 15/136,327, filed Apr. 22, 2016, entitled "Calculating Data Value via Data Protection Analytics," the disclosure of which is incorporated herein in its entirety.

It is to be appreciated that the above valuation processes are intended to be examples only, and thus other valuation algorithms and techniques can be used in alternative embodiments. Furthermore, while such valuation processes may be applied to data sets associated with the organization, the valuation techniques can also be applied to other assets related to data of the organization including, but not limited to, applications, services, etc.

Figure 4:
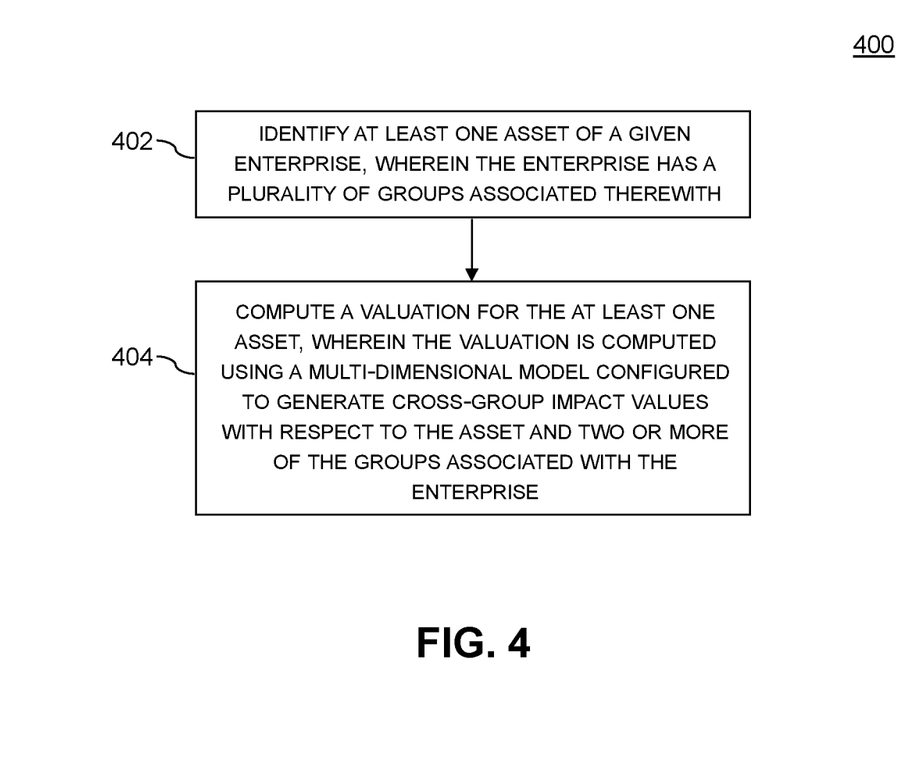
FIG. 4 illustrates an asset valuation methodology using multi-dimensional model functionality, according to an illustrative embodiment.

FIG. 4 illustrates an asset valuation methodology using multi-dimensional model functionality, according to an illustrative embodiment. In one non-limiting example, the asset may be a data set.

Step 402 identifies at least one asset of a given enterprise, wherein the enterprise has a plurality of groups associated therewith.

Step 404 computes a valuation for the at least one asset. The valuation is computed using a multi-dimensional model configured to generate cross-group impact values with respect to the asset and two or more of the groups associated with the enterprise.

At least portions of the data storage system environment with a data valuation framework using multi-dimensional model functionality shown in FIGS. 1-4 may be implemented using one or more processing platforms associated with one or more information processing systems. In some embodiments, a given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one. In many embodiments, logic may be executed across one or more physical or virtual processors. In certain embodiments, a virtual processor may be mapped to and executed on or across a portion of one or more virtual or physical processors.

As is apparent from the above, one or more of the processing modules or other components of the data storage system environment with a data valuation framework using multi-dimensional model functionality shown in FIGS. 1-4 may each run on a computer, server, storage device or other processing platform element. A given such element may be viewed as an example of what is more generally referred to herein as a "processing device." An example of such a processing platform is processing platform 500 shown in FIG. 5.

Figure 5:
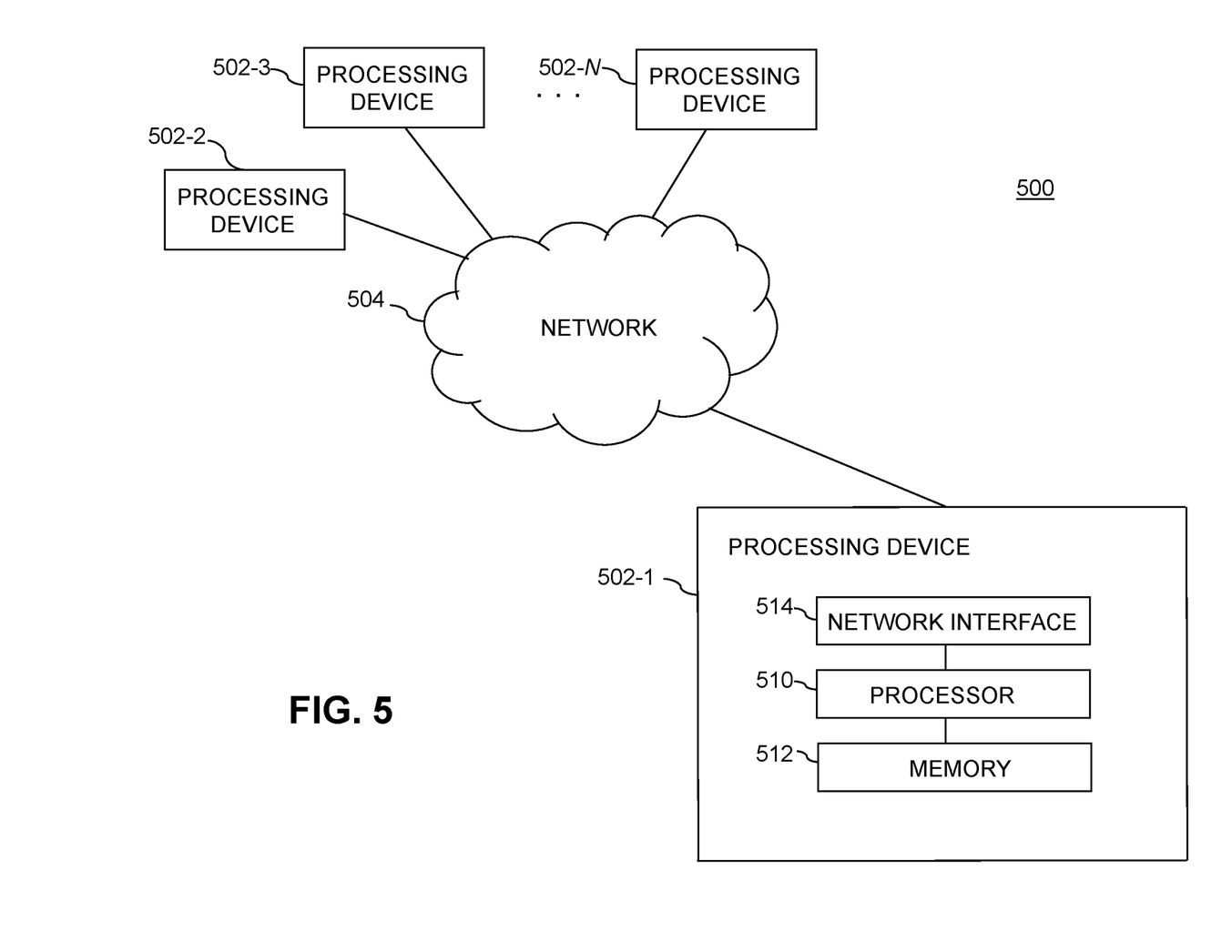
FIG. 5 illustrates a processing platform used to implement a data valuation framework with multi-dimensional model functionality, according to an illustrative embodiment.

The processing platform 500 in this embodiment comprises a plurality of processing devices, denoted 502-1, 502-2, 502-3, . . . 502-N, which communicate with one another over a network 504.

The network 504 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Some networks utilized in a given embodiment may comprise high-speed local networks in which associated processing devices communicate with one another utilizing Peripheral Component Interconnect Express (PCIe) cards of those devices, and networking protocols such as InfiniBand, Gigabit Ethernet or Fibre Channel.

The processing device 502-1 in the processing platform 500 comprises a processor 510 coupled to a memory 512.

The processor 510 may comprise a microprocessor, a microcontroller, an application-specific integrated circuit (ASIC), a field-programmable gate array (FPGA) or other type of processing circuitry, as well as portions or combinations of such circuitry elements.

The memory 512 may comprise random access memory (RAM), read-only memory (ROM) or other types of memory, in any combination. The memory 512 and other memories disclosed herein should be viewed as illustrative examples of what are more generally referred to as "processor-readable storage media" storing executable program code of one or more software programs.

Articles of manufacture comprising such processor-readable storage media are considered embodiments of the present disclosure. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 502-1 of the example embodiment of FIG. 5 is network interface circuitry 514, which is used to interface the processing device with the network 504 and other system components, and may comprise conventional transceivers.

The other processing devices 502 of the processing platform 500 are assumed to be configured in a manner similar to that shown for processing device 502-1 in the figure.

Again, this particular processing platform is presented by way of example only, and other embodiments may include additional or alternative processing platforms, as well as numerous distinct processing platforms in any combination, with each such platform comprising one or more computers, servers, storage devices or other processing devices.

For example, other processing platforms used to implement embodiments of the disclosure can comprise different types of virtualization infrastructure, in place of or in addition to virtualization infrastructure comprising virtual machines. Such virtualization infrastructure illustratively includes container-based virtualization infrastructure configured to provide Docker containers or other types of Linux containers (LXCs).

The containers may be associated with respective tenants of a multi-tenant environment, although in other embodiments a given tenant can have multiple containers. The containers may be utilized to implement a variety of different types of functionality within the system. For example, containers can be used to implement respective cloud compute nodes or cloud storage nodes of a cloud computing and storage system. The compute nodes or storage nodes may be associated with respective cloud tenants of a multi-tenant environment. Containers may be used in combination with other virtualization infrastructure such as virtual machines implemented using a hypervisor.

As another example, portions of a given processing platform in some embodiments can comprise converged infrastructure such as VxRail™, VxRack™ or Vblock® converged infrastructure commercially available from VCE, the Virtual Computing Environment Company, now the Converged Platform and Solutions Division of Dell EMC. For example, portions of a data storage system environment with a data valuation framework using multi-dimensional model functionality of the type disclosed herein can be implemented utilizing converged infrastructure.

It should therefore be understood that in other embodiments different arrangements of additional or alternative elements may be used. In many embodiments, at least a subset of these elements may be collectively implemented on a common processing platform, or each such element may be implemented on a separate processing platform.

Also, in other embodiments, numerous other arrangements of computers, servers, storage devices or other components are possible in the system and methods described herein. Such components can communicate with other elements of the system over any type of network or other communication media.

As indicated previously, in some embodiments, components of the data storage system environment with a data valuation framework using multi-dimensional model functionality as disclosed herein can be implemented at least in part in the form of one or more software programs stored in memory and executed by a processor of a processing device. For example, at least portions of the execution environment or other system components are illustratively implemented in one or more embodiments the form of software running on a processing platform comprising one or more processing devices.

It should again be emphasized that the above-described embodiments of the disclosure are presented for purposes of illustration only. Many variations and other alternative embodiments may be used. For example, the disclosed techniques are applicable to a wide variety of other types of systems and assets. Also, the particular configurations of system and device elements, associated processing operations and other functionality illustrated in the drawings can be varied in other embodiments. Moreover, the various assumptions made above in the course of describing the illustrative embodiments should also be viewed as exemplary rather than as requirements or limitations of the embodiments. Numerous other alternative embodiments within the scope of the appended claims will be readily apparent to those skilled in the art.

What is claimed is:

1. A method comprising:
    identifying at least one asset of a given enterprise, wherein the enterprise has a plurality of groups associated therewith; and
    implementing a data valuation module having multi-dimensional model logic: computing, in response to a query from an application programming interface, a valuation for the at least one asset using the multi-dimensional model logic to generate cross-group impact values with respect to the at least one asset and two or more of the groups associated with the enterprise; storing results of the data valuation: and
    displaying the results in a form representative of the cross-group impact values of the at least one asset relative to the two or more groups:
    wherein the at least one asset is a set of data;
    wherein the cross-group impact values represent a cost of one or more of communication and dependencies between the groups; and
    wherein the multi-dimensional model is in the form of a matrix data structure: wherein a given cross-group impact value represents one or more costs of sharing the set of data between at least a first group and a second group:
    wherein a first cost of transferring the set of data from the first group to the second group is different than a second cost of transferring the data from the second group to the first group: and
    wherein the steps are performed by one or more processing devices, each processing device comprising a processor and a memory.

2. The method of claim 1, wherein the cross-group impact values are off-diagonal entries in the matrix data structure.

3. The method of claim 2, wherein diagonal entries in the matrix data structure are independent group values that do not reflect cross-group impact.

4. The method of claim 1, wherein a row in the matrix data structure represents a multi-dimensional valuation of the asset for a given one of the groups.

5. The method of claim 4, wherein a column in the matrix data structure represents a feature of interest for the asset.

6. The method of claim 1, wherein the matrix data structure is non-symmetrical and wherein diagonal entries are percentages of the data deemed to be correct by a group and off-diagonal entries are correlations of parts of the set of data that two or more groups deem correct.

7. The method of claim 1, wherein the matrix data structure is non-symmetrical and wherein diagonal entries are percentages of the data deemed to be complete by a group and off-diagonal entries are correlations of parts of the set of data that two or more groups deem complete.

8. The method of claim 1, wherein the matrix data structure is non-symmetrical and wherein diagonal entries are percentages of the uniqueness of the data for a group and off-diagonal entries are correlations of parts of the set of data that two or more groups do not maintain as unique.

9. The method of claim 1, wherein the matrix data structure is non-symmetrical and wherein diagonal entries are relevance values of the data for a group and off-diagonal entries are correlations of parts of the set of data that two or more groups deem relevant.

10. The method of claim 1, wherein the computed valuation further comprises computing a vector defining a utility of the data at a given time instance per group.

11. The method of claim 1, wherein the computed valuation further comprises computing a vector defining a useful life span of the data at a given time instance per group.

12. The method of claim 1, wherein the groups comprise organizations within the enterprise.

13. The method of claim 1, wherein the groups comprise functional uses within the enterprise.

14. The method of claim 1, wherein the groups comprise storage locations within the enterprise.

15. An article of manufacture comprising a non-transitory processor-readable storage medium having stored therein executable code of one or more software programs, wherein the one or more software programs when executed by one or more processing devices implement steps of:
identifying at least one asset of a given enterprise, wherein the enterprise has a plurality of groups associated therewith; and
implementing a data valuation module having multi-dimensional model logic:
computing, in response to a query from an application programming interface, a valuation for the at least one asset using the multi-dimensional model logic to generate cross-group impact values with respect to the at least one asset and two or more of the groups associated with the enterprise;
storing results of the data valuation: and
displaying the results in a form representing the cross-group impact values of the at least
one asset relative to the two or more groups:
wherein the at least one asset is a set of data; and
wherein the cross-group impact values represent a cost of one or more of communication and dependencies between the groups wherein the multi-dimensional model is in the form of a matrix data structure; wherein a given cross-group impact value represents one or more costs of sharing the set of data between at least a first group and a second group; and wherein a first cost of transferring the set of data from the first group to the second group is different than a second cost of transferring the data from the second group to the first group.

16. A system comprising:
one or more processors operatively coupled to one or more memories configured to: identify at least one asset of a given enterprise, wherein the enterprise has a plurality of groups associated therewith; and
implement a data valuation module having multi-dimensional model logic: compute, in response to a query from an application programming interface, a valuation for the at least one asset using the multi-dimensional model logic to generate cross-group impact values with respect to the at least one asset and two or more of the groups associated with the enterprise; store results of the data valuation: and display the results in a form representing the cross-group impact values of the at least one asset relative to the two or more groups:
wherein the at least one asset is a set of data; and
wherein the cross-group impact values represent a cost of one or more of communication and dependencies between the groups
wherein the multi-dimensional model is in the form of a matrix data structure: and wherein a given cross-group impact value represents one or more costs of sharing the set of data between at least a first group and a second group: and
wherein a first cost of transferring the set of data from the first group to the second group is different than a second cost of transferring the data from the second group to the first group.

17. The article of manufacture of claim 15, further:
wherein the cross-group impact values are off-diagonal entries in the matrix data structure; and
wherein diagonal entries in the matrix data structure are independent group values that do not reflect cross-group impact.

18. The system of claim 16, further:
wherein the cross-group impact values are off-diagonal entries in the matrix data structure; and
wherein diagonal entries in the matrix data structure are independent group values that do not reflect cross-group impact.

19. The system of claim 16, wherein a row in the matrix data structure represents a multi-dimensional valuation of the set of data for a given one of the groups.

20. The system of claim 19, wherein a column in the matrix data structure represents a feature of interest for the set of data.

* * * * *

UNITED STATES PATENT AND TRADEMARK OFFICE
CERTIFICATE OF CORRECTION

PATENT NO. : 10,915,961 B1
APPLICATION NO. : 15/669523
DATED : February 9, 2021
INVENTOR(S) : Stephen Todd et al.

It is certified that error appears in the above-identified patent and that said Letters Patent is hereby corrected as shown below:

In the Claims

Claim 1, Column 12, Line 23 please delete "and"

Claim 1, Column 12, Line 25 please delete "logic:" and insert therefor --logic;--

Claim 1, Column 12, Line 31 please delete "data valuation:" and insert therefor --data valuation;--

Claim 1, Column 12, Line 34 please delete "two or more groups:" and insert therefor --two or more groups;--

Claim 1, Column 12, Line 38 please delete "and"

Claim 1, Column 12, Line 40 please delete "matrx data structure:" and insert therefor --matrix data structure;--

Claim 1, Column 12, Line 43 please delete "second group:" and insert therefor --second group;--

Claim 1, Column 12, Line 47 please delete "first group:" and insert therefor --first group;--

Claim 15, Column 13, Line 33 please delete "and"

Claim 15, Column 13, Line 35 please delete "model logic:" and insert therefor --model logic;--

Claim 15, Column 13, Line 42 please delete "data valuation:" and insert therefor --data valuation;--

Claim 15, Column 13, Line 45 please delete "more groups:" and insert therefor --more groups;--

Claim 15, Column 13, Line 46 please delete "and"

Signed and Sealed this
Eighteenth Day of May, 2021

Drew Hirshfeld
*Performing the Functions and Duties of the
Under Secretary of Commerce for Intellectual Property and
Director of the United States Patent and Trademark Office*

CERTIFICATE OF CORRECTION (continued)
U.S. Pat. No. 10,915,961 B1

Claim 15, Column 13, Line 49 please delete "between the groups" and insert therefor --between the groups;--

Claim 16, Column 14, Line 9 please delete "and"

Claim 16, Column 14, Line 11 please delete "model logic:" and insert therefor --"model logic;"--

Claim 16, Column 14, Line 17 please delete "data valuation:" and insert therefor --"data valuation;"--

Claim 16, Column 14, Line 20 please delete "and"

Claim 16, Column 14, Line 23 please delete "between the groups" and insert therefor --between the groups;--

Claim 16, Column 14, Line 25 please delete "data structure:" and insert therefor --data structure;--

Claim 16, Column 14, Line 28 please delete "second group:" and insert therefor --second -group;--